(12) United States Patent
Zheludkov et al.

(10) Patent No.: US 8,526,488 B2
(45) Date of Patent: Sep. 3, 2013

(54) VIDEO SEQUENCE ENCODING SYSTEM AND ALGORITHMS

(75) Inventors: Alexander Zheludkov, Saint-Petersburg (RU); Alexey Martemyanov, Saint-Petersburg (RU); Nickolay Terterov, Saint-Peterburg (RU); Ivan Minin, Vitebsk (BY); Michael Axenov, Pskov (RU)

(73) Assignee: Vanguard Software Solutions, Inc., Los Altos, CA (US)

( * ) Notice: Subject to any disclaimer, the term of this patent is extended or adjusted under 35 U.S.C. 154(b) by 361 days.

(21) Appl. No.: 13/024,117

(22) Filed: Feb. 9, 2011

(65) Prior Publication Data

US 2011/0194615 A1    Aug. 11, 2011

Related U.S. Application Data

(60) Provisional application No. 61/302,787, filed on Feb. 9, 2010.

(51) Int. Cl.
*H04N 7/50* (2006.01)

(52) U.S. Cl.
USPC .......................................... 375/240; 382/233

(58) Field of Classification Search
USPC ....................................................... 375/240
See application file for complete search history.

(56) References Cited

U.S. PATENT DOCUMENTS

| | | | |
|---|---|---|---|
| 5,640,208 A | 6/1997 | Fujinami | |
| 5,671,018 A | 9/1997 | Ohara et al. | |
| 5,778,190 A | 7/1998 | Agarwal | |
| 5,796,435 A | 8/1998 | Nonomura et al. | |
| 5,812,788 A | 9/1998 | Agarwal | |
| 6,044,115 A | 3/2000 | Horiike et al. | |
| 6,055,330 A | 4/2000 | Eleftheriadis et al. | |
| 6,081,554 A | 6/2000 | Lee et al. | |
| 6,091,777 A | 7/2000 | Guetz et al. | |
| 6,233,278 B1 | 5/2001 | Dieterich | |
| 6,263,020 B1 | 7/2001 | Gardos et al. | |
| 6,317,520 B1 | 11/2001 | Passaggio et al. | |
| 6,434,196 B1 | 8/2002 | Sethuraman et al. | |
| 6,438,168 B2 | 8/2002 | Arye | |

(Continued)

FOREIGN PATENT DOCUMENTS

KR          1020040068535 A          7/2004

OTHER PUBLICATIONS

M. Schindler, A Fast Renormalisation for Arithmetic Coding, Proc. Data Compression Conference, Mar. 30-Apr. 1, 1998, p. 572, Snowbird, Utah, U.S.A.

(Continued)

*Primary Examiner* — William C Vaughn, Jr.
*Assistant Examiner* — Noad Belai
(74) *Attorney, Agent, or Firm* — Fitch, Even, Tabin & Flannery LLP

(57) ABSTRACT

The video sequence encoding system with high compression efficiency is based on the H.264/AVC international video coding standard and is implementing proposed algorithms for: macroblock motion estimation; simplified rate-distortion optimization for transform size decision-making; acceleration of optimal macroblock type decision; modulation of quantization parameter with look-ahead refinement; and film-grain parameters calculation. The video encoding system comprises a motion estimation unit based on a measurement function for motion search of the matching texture block; a macroblock decision making unit; a pipeline processing module configured to accelerate complex transform; and a quantization parameter modulator configured to enhance the picture quality.

18 Claims, 3 Drawing Sheets

(56) References Cited

U.S. PATENT DOCUMENTS

| | | | |
|---|---|---|---|
| 6,445,828 | B1 | 9/2002 | Yim |
| 6,459,427 | B1 | 10/2002 | Mao et al. |
| 6,483,505 | B1 | 11/2002 | Morein et al. |
| 6,496,607 | B1 | 12/2002 | Krishnamurthy et al. |
| 6,594,395 | B1 | 7/2003 | Forchheimer et al. |
| 6,597,739 | B1 | 7/2003 | Li et al. |
| 6,683,992 | B2 | 1/2004 | Takahashi et al. |
| 6,909,810 | B2 | 6/2005 | Maeda |
| 6,925,126 | B2 * | 8/2005 | Lan et al. ................. 375/240.25 |
| 6,940,903 | B2 | 9/2005 | Zhao et al. |
| 6,965,643 | B1 | 11/2005 | Maeda et al. |
| 7,110,459 | B2 | 9/2006 | Srinivasan |
| 7,336,720 | B2 | 2/2008 | Martemyanov et al. |
| 7,440,502 | B2 * | 10/2008 | Altunbasak et al. ..... 375/240.24 |
| 8,023,562 | B2 | 9/2011 | Zheludkov et al. |
| 2002/0061138 | A1 | 5/2002 | Uenoyama et al. |
| 2003/0063667 | A1 | 4/2003 | Sriram et al. |
| 2003/0231796 | A1 | 12/2003 | Caviedes |
| 2005/0013497 | A1 | 1/2005 | Hsu et al. |
| 2005/0024487 | A1 | 2/2005 | Chen |
| 2005/0286630 | A1 | 12/2005 | Tong et al. |
| 2006/0055826 | A1 | 3/2006 | Zimmermann et al. |
| 2006/0062304 | A1 | 3/2006 | Hsia |
| 2006/0153539 | A1 | 7/2006 | Kaku |
| 2006/0262860 | A1 | 11/2006 | Chou et al. |
| 2006/0262983 | A1 | 11/2006 | Cheng et al. |
| 2007/0074266 | A1 | 3/2007 | Raveendran et al. |
| 2010/0054331 | A1 | 3/2010 | Haddad et al. |
| 2010/0165077 | A1 | 7/2010 | Yin et al. |
| 2011/0249739 | A1 | 10/2011 | Liu et al. |

OTHER PUBLICATIONS

G. N. N. Martin, Range encoding: an algorithm for removing redundancy from a digitized message, IBM UK Scientific Center (paper presented in Mar. 1979 to the Video & Data Recording Conference held in Southampton Jul. 24-27).

John Watkinson, The Engineer's Guide to Compression, 1996, pp. 62-72, Snell & Wilcox Ltd., Sunnyvale, California, U.S.A.

Yao Wang et al., Review of Error Resilient Coding Techniques for Real-Time Video Communications, IEEE Signal Processing Magazine, Jul. 2000, pp. 61-82, vol. 17, No. 4, USA.

Rui Zhang et al., Video Coding with Optimal Inter/Intra-Mode Switching for Packet Loss Resilience, IEE Journal on Selected Areas in Communications, Jun. 2000, pp. 966-976, vol. 18, No. 6, USA.

Minyoung Kim, et al., PBPAIR: An Energy-efficient Error-resilient Encoding Using Probability Based Power Aware Intra Refresh, Mobile Computing and Communications Review Publication, 2006, pp. 58-59, 10(3), Irvine, California, USA.

Alp Erturk and Sarp Erturk,"Two-Bit Transform for Binary Block Motion Estimation", IEEE Transactions on Circuits and Systems for Video Technology—TCSV , vol. 15, No. 7, pp. 938-946, 2005.

Sarp Erturk and Tae Gyu Chang,"Wavelet Domain One-Bit Transform for Low-Complexity Motion Estimation", IEEE International Symposium on Circuits and Systems—ISCAS , 2006.

Colin Doutre and Panos Nasiopoulos, "Motion Vector Prediction for Improving One Bit Transform Based Motion Estimation", IEEE International Conference on Acoustics, Speech, and Signal Processing (ICASSP 2008), Las Vegas, Nevada, pp. 805-808, Apr. 2008.

Youn-Long Steve Lin, Chao-Yang Kao Huang-Chih Kuo, Jian-Wen Chen, "VLSI Design for Video Coding: H.264/AVC Encoding from Standard Specification to Chip", DOI 10.1007/978-1-4419-0959-6_1, Springer Science+Busines Media, LLC 2010.

Maya Gokhale and Paul S. Graham "Reconfigurable Computing. Accelerating Computation with Field-Programmable Gate Arrays" Springer, 2005.

* cited by examiner

VIDEO SEQUENCE ENCODING SYSTEM AND ALGORITHMS

CROSS-REFERENCE TO RELATED APPLICATION

This application claims benefit of U.S. Provisional Application No. 61/302,787, filed Feb. 9, 2010, which is hereby incorporated herein by reference in its entirety.

FIELD OF THE INVENTION

This application relates to video encoding systems (codecs) used preferably for broadcast over cable, satellite, cable modem, DSL, terrestrial, etc; conversational and multimedia streaming services over Ethernet, LAN, DSL, wireless and mobile networks; news cameras or studio video manipulation equipment, or as a part of a computer system, which involves real-time or close to real-time video compression and transfer: video conferencing systems, video translation systems, video security and surveillance systems, etc.

BACKGROUND

Video codecs are employed to convert initial video sequence (a set of video images, also named pictures, or frames) into encoded bitstream (a set of compressed video sequence binary data), and also converting video sequence binary data produced by a video codec system into a reconstructed video sequence (a decoded set of video images, or reconstructed frames). (While the expression "codec" can be viewed as referring to a component that serves to both "code" and "decode" information, as used herein it will be understood that a "codec" at least serves to code information and may, or may not, also serve to decode information.) Hereinafter, the terms "frame" and "picture" are assumed to be identical.

Video coding for telecommunication applications have evolved through development of a number of video coding standards in a continued effort to maximize coding efficiency and hence reduce bandwidth requirements. One relatively new international video coding standard H.264/AVC is designed to enable improved operation for a broad variety of applications which may be deployed over existing and future networks.

It is known that video compression relies on two basic assumptions. The first is that human sensitivity to noise in the picture (frame) is highly dependent on the frequency of the noise. The second is that in a picture sequence every picture usually has a lot in common with the preceding picture. In a picture the large objects result in low spatial frequencies, whereas small objects result in high spatial frequencies. The noise detected by human vision is mostly at low spatial frequencies. The data may be compressed by sending information describing only the difference between one picture and the next, and raising the noise where it cannot be detected, thus shortening the length of data words.

A video sequence contains a significant amount of statistical and subjective redundancy within and between pictures that can be reduced by data compression technique to make its size smaller. For still pictures (as in JPEG format), an intra-frame or spatial redundancy is used, which treats each picture individually, without reference to any other picture. In Intra-coding the main step is to perform a spatial frequency analysis of the image, using a known technique of Discrete Cosine Transform (DCT). DCT converts input pixels into a form in which the redundancy can be identified. The picture is broken up into rectangular areas called macroblocks and converted a macroblock at a time. In most video coding formats the reduction of spatial redundancy is reached by intra prediction, which means that the texture of the current macroblock is predicted from a reconstructed texture of one or more previously coded macroblocks, and the transform is applied to the macroblock texture prediction residual. Other kinds of the texture transform also may be used instead of DCT.

For moving pictures, the mode of Inter-coding is known to be used to exploit the redundancy between pictures, which gives a higher compression factor than the Intra-coding. The "difference" picture is produced by subtracting every pixel in one picture from a corresponding prediction pixel derived from the previously coded pictures. After that the transform is applied to the blocks of the difference picture. All major prior video coding standards use a transform block size of 8×8.

The new H.264 video coding standard provides the possibility of using two types of texture transforms in High Profile Coding. In the H.264 standard a picture is divided into macroblocks, each covering an area of 16×16 samples of the luma component, which represents brightness, and 8×8 samples of each of the two chroma components, which represent the extent to which the color deviates from gray to blue and from gray to red. The macroblock 16×16 texture prediction residual for the luma component may be either divided into 16 blocks of the size 4×4, which are the subject of 4×4 texture transform, or divided into 4 blocks of the size 8×8, for which 8×8 transform is applied.

For many application settings it can be important for the efficient video compression in H.264 standard to choose the optimal transform size for the macroblocks where both types of texture transform can be used. However, a simple selection criteria like texture prediction residual SAD (sum of absolute differences) or Hadamard transform appear to be hardly applicable for this purpose.

Many prior art practitioners consider that the only known method which is adequate for making a transform size decision is a method based on a full rate-distortion optimization. However, this method requires full block texture processing (including the texture transform, quantization of 256 transform coefficients, their de-quantization and inverse transform) for both transform types. Moreover, for both transform types the calculation of the number of entropy coding bits is required. This makes this method, as well as most or possible even all other known conventional rate-distortion optimization methods, quite slow and complicated, which calls for a new efficient algorithm for making a decision for an optimal transform size in H.264 standard.

The most computationally complex part of H.264 video encoding is the procedure of the choice of optimal macroblock type (intra 4×4, intra 16×16, inter), and the parameters related to the type chosen. Hereafter it is assumed for simplicity that the choice is done between intra 4×4, intra 16×16 and inter macroblock types. In most H.264 encoders the following scheme is used for this decision-making procedure. At the first stage the best parameters for each of three possible macroblock types are derived. Namely, a calculation is made for the optimal motion data for Inter macroblock type, the optimal Intra 16×16 prediction mode for Intra 16×16 type and 16 optimal intra 4×4 prediction modes for Intra 4×4 type. After that some quality function (such as SAD or rate-distortion Lagrangian value) is calculated for the optimal collection of the parameters for each of the three possible macroblock types. Finally, the macroblock type providing the best value of the quality function is chosen.

Since a large variety of fast and efficient motion estimation methods are known, the calculation of the optimal prediction modes for Intra 4×4 macroblock type becomes the most highly computational part of the decision-making method described above. Indeed, one should select one of the nine Intra 4×4 prediction modes for each of sixteen 4×4 sub-blocks. Therefore, the decision-making procedure would be much faster and simpler if the calculation of the optimal parameters for Intra 4×4 macroblock type could be omitted at least for a part of the picture macroblocks. Of course, this should be done without reducing the compression efficiency.

Many of the motion estimation algorithms used in video encoding are based on a best matching block search. That is, the current texture block is being compared with some set of reference picture "candidate" texture blocks of the same size. The reference picture block from this set that provides the best correspondence to the current texture block is considered as the reference block, and the spatial offset between the current block position and the reference block position is considered as a motion vector. Thus, two algorithmic components define completely such motion estimation methods. The first component is the algorithm for generating a set of the candidate reference blocks spatial positions. The second component is the method for correspondence measurement of the texture blocks. The most conventional cost function for texture blocks correspondence measurement is the weighted sum of the block texture SAD (Sum of Absolute Differences) of the corresponding pixel values of the blocks, and the motion vector cost.

However, in some situations the cost functions described above provide absolutely inadequate texture prediction and cause notable visual artifacts for low bit-rate video coding. For example, if the pictures contain a nonlinearly moving object on a slowly varying low-complexity background, then sometimes the typical residual artifacts could be noted along the object trajectory, which is caused by improper motion compensation. That is why the choice of the appropriate cost function appears to be highly important for providing the sufficient visual quality of the low bit-rate video sequences.

A quantization parameter is used for determining the quantization of transform coefficients in H.264 standard. There is a need to optimize the calculation of macroblock quantization parameters in order to provide a more adequate and efficient encoding in terms of video compression efficiency and visual quality ratio.

The idea of pre-processing the sequence of frames using the pixels of current and previous frames was repeatedly treated in the prior art. However, most processing algorithms suffer from very high complexity.

A typical traditional approach is to carry out each transform sequentially for the whole video frame. Each High Definition (HD) video frame, however, occupies about 3 MB of memory. Therefore, such an approach will lead to extensive data exchanges between the processor and external memory. Furthermore, similar post-processing transforms should be done on the decoder side as well. Thus, pre- and post-processing appears to be the most resource-consuming operations for HD video.

Many film-originated videos have exhibit a so called film-grain effect. Film grain results from the physical granularity of the photographic emulsion. Preservation of the grainy appearance of film is often desirable for artistic reasons. On the other hand, film grain has very high entropy and is not very compressible using traditional compression schemes, such as MPEG2 or H.264 standard. Moreover, compression without removing film-grain partially removes and distorts that film-grain effect. A better approach might be to remove the film-grain from the original video before encoding, and to later emulate similar film-grain effects on the decoder side, using some predefined model and film-grain parameters. The H.264 standard defines some optional messages to pass such parameters on to the decoder. However, there is a need to meaningfully calculate such parameters on the encoder side in the first place.

In view of the increasing use of real-time and close-to-real-time video compression and the arrival of the H.264/AVC standard that improves the quality of real-time video communications, there is a need for new effective algorithms applicable to video encoders that are compatible with the new improved H.264/AVC standard.

DETAILED DESCRIPTION

Figure 1:
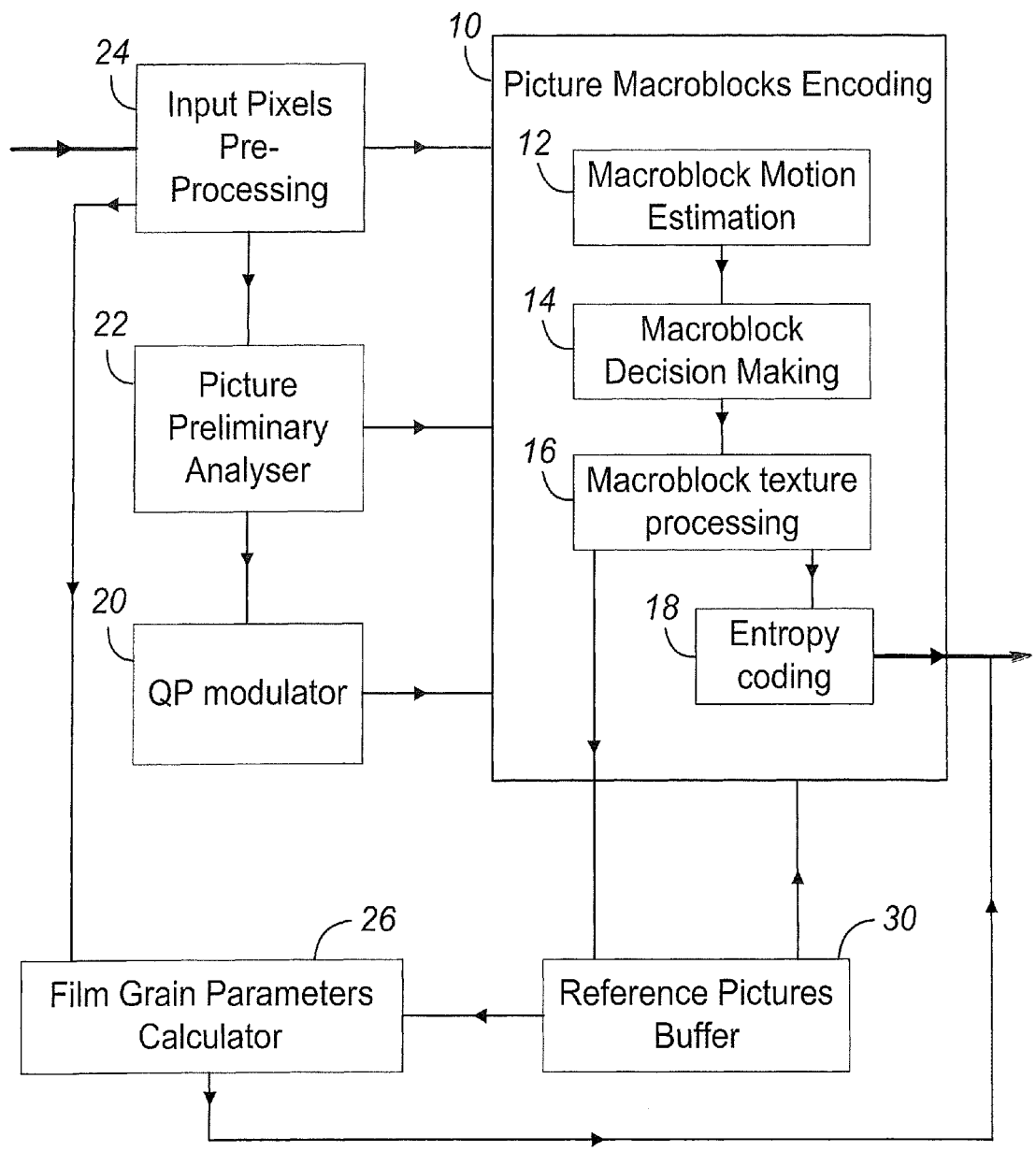
FIG. 1 shows a block-diagram of a H.264 High Profile Video Encoding system incorporating the proposed algorithms of the present application.

It will be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

The proposed codec is designed to transform an input video sequence into a compressed bitstream, so that the video sequence can be restored from the bitstream by a corresponding decoder. The proposed video encoding and decoding system is based on the H.264/AVC international video coding standard and implements new algorithms that simplify the calculation procedure while actually enhancing the efficiency of the video encoding.

A digitized picture (that comprises a part of a video sequence) is divided into macroblocks having a size of 16×16 pixels upon entering a macroblock encoder 10. The macroblock encoder 10 comprises the following modules: a macroblock motion estimator 12, a macroblock decision making module 14, a macroblock texture processor 16 and an entropy coding module 18. Each macroblock is coded based on the current picture, the data of one or more of any previously coded reference pictures for this particular sequence of pictures (which information can be received, for example, from a reference picture (RP) buffer 30), and a value of a quantization parameter (QP) received from a QP modulator 20, where the quantization parameters are calculated for at least some or preferably all of the picture macroblocks.

The aforementioned macroblock decision making module 14 selects the best macroblock type, the best transform size, etc. based on calculations described below. The macroblock texture processor 16 provides texture prediction, quantization, transform, and reconstruction for each macroblock of the picture.

By one approach, before entering the macroblock encoder 10 a raw picture can be pre-processed in a pre-processing module 24. This pre-processing module 24 provides resizing, denoising, and deinterlacing of the picture pixels to prepare the digitized video sequence for encoding. It can also divide the digitized picture into groups of pixels to thereby provide the macroblocks; perform format transforms; perform filtering; and provide the raw picture quality improvement.

Also if desired, a preliminary analyzer 22 that operably couples to the pre-processing module 24 calculates complexity maps, provides rough motion estimation, and optionally some other parameters based on the content received from the pre-processing module 24, and sends the results to the macroblock encoder 10 and to the aforementioned QP modulator 20.

The previously-mentioned RP buffer 30 further collects the reconstructed texture of the encoded picture from the macroblock texture processor 16 and saves that information for future use as a previously coded and reconstructed reference picture (RP). The reconstructed picture data from the RP buffer 30 may be used for example for optionally adding film grain parameters to the encoded picture in a Film Grain Calculator 26.

So configured, the output of the macroblock encoder 10 is a compressed digitized video stream which is transferred (for example, via wireless and/or non-wireless transfer mechanism of choice) and then subsequently reconstructed in a corresponding decoding unit.

Presented below are the preferred algorithms implemented in the H.264 video encoding system of FIG. 1.

1. Macroblock Motion Estimation

In the illustrative examples provided herein, motion estimation is performed for each macroblock in the Macroblock Motion Estimator 12 of FIG. 1. These teachings will accommodate, however, performing such estimation for less that each macroblock for each frame if desired.

The introduced algorithm for motion estimation is based on a complexity-based motion search cost function for low-bit-rate video coding. According to the H.264 standard, each macroblock of size 16×16 may consist of 1-16 texture blocks, which may have sizes 16×16, 16×8, 8×16, 8×8, 8×4, 4×8 or 4×4; each of these blocks may have its own motion vector.

Most of the known motion estimation algorithms used in video encoding are based on a block-matching search. That is, a current texture block is being compared with some set of "candidate" texture blocks of the same size derived from a reference picture RP. The RP block from this set that provides a best correspondence to the current texture block is considered as the reference block RB, and the spatial offset between the current block position and the reference block position serves as a corresponding motion vector.

Most of the conventional cost functions are based on SAD or Hadamard transform. A SAD calculation, however, can provide absolutely inadequate texture prediction and cause notable visual artifacts for low bit-rate video coding, as was indicated earlier in this application.

Introduced below is a measurement function for the motion search of the matching texture block. The usage of this function in the motion estimation algorithms minimizes the visual artifacts caused by the improper motion estimation in low bit-rate video coding.

The following parameters are described and defined as follows:

QP—is a quantization parameter used for video encoding;

mvx, mvy—components of difference between the current motion offset and the current motion vector prediction (or its approximation);

M, N—width and height of the current texture block;

I—two-dimensional M×N array of the initial texture luminance component values corresponding to the current texture block with the elements $I(x,y), x \in [0, M-1], y \in [0, N-1]$.

R—a two-dimensional M×N array of the texture prediction luminance component values corresponding to the reference texture block with the elements $R(x,y), x \in [0, M-1], y \in [0, N-1]$;

D—a two-dimensional M×N array of the differences between the corresponding elements of I and R:

$D(x,y) = I(x,y) - R(x,y)$;

SAD(I,R)—the Sum of Absolute Differences between the corresponding elements of the arrays I and R;

$B_H(x)$, $B_V(y)$—boundary indicator functions for the first and the second indices of the two-dimensional M×N array, which are equal to:

+1, if the index equals a minimal value (zero),

−1, if the index equals a maximal value ((M−1) for $B_H(x)$ and (N−1) for $B_V(y)$), and 0—otherwise.

An auxiliary function F(A, x, y, dx, dy) for the entries of the two-dimensional M×N array A is defined as follows:

$$F = \frac{1}{8} \cdot \left| 9 \cdot A(x,y) - \sum_{k=-1}^{1} \sum_{j=-1}^{1} A(x+j, y+k) \right|,$$

if $dx = 0$ and $dy = 0$;

$$F = \frac{1}{4} |4 \cdot A(x,y) - A(x+dx, y) - A(x, y+dy) - 2 \cdot A(x+dx, y+dy)|,$$

if $dx \neq 0$ and $dy \neq 0$;

$$F = \frac{1}{8} \cdot \left| \begin{array}{l} 8 \cdot A(x,y) - A(x, y-1) - A(x, y+1) - \\ 2 \cdot (A(x+dx, y-1) + A(x+dx, y) + A(x+dx, y+1)) \end{array} \right|,$$

if $dx \neq 0$ and $dy \neq 0$; and $$F = \frac{1}{8} \cdot \left| \begin{array}{l} 8 \cdot A(x,y) - A(x-1, y) - A(x+1, y) - \\ 2 \cdot (A(x-1, y+dy) + A(x, y+dy) + A(x+1, y+dy)) \end{array} \right|,$$

if $dx \neq 0$ and $dy \neq 0$.

The complexity function for the array A is defined as:

$$C(A) = \sum_{y=0}^{N-1} \sum_{x=0}^{M-1} F(A, x, y, B_H(x), B_V(y))$$

Finally, the texture block matching measurement function for the motion search is calculated as:

$W(I,R,M,N,QP,mvx,mvy) = C(I) \cdot (SAD(I,R) + Cost(M,N, mvx, mvy, QP)) + M \cdot N \cdot C(R)$ In the above expression, Cost(M, N, mvx, mvy, QP) is the cost function of the motion vector that is typically used in SAD-based motion search algorithms and may be calculated in different ways. For example, for H.264 video encoding this function may be defined as:

$Cost(M,N,mvx,mvy,QP) = 4 \cdot QP \cdot (10 - \log_2(M \cdot N)) \cdot (U(|mvx|) + U(|mvy|))$ where U(X) denotes minimal positive integer with the inequality $X \cdot 2^{-(U(X)+2)} < 1$ 2. Simplified Rate-Distortion Optimization Algorithm for Transform Size Decision-Making in H.264 High Profile Video Encoding As noted earlier, in some application settings an important part of efficient video compression can be choosing the macroblock optimal transform size. In contrast to the conventional Rate-Distortion Optimization method used in H.264 encoding, the proposed algorithm is relatively simple and does not require, for example, summing up the full texture transforms, inverse transforms, 512 coefficients scaling and 512 square differences. Instead, it comprises calculation and scaling of only 32 simply-derived coefficients together with 32 square differences. Moreover, a very simple formula for estimation of texture compressed macroblock size is used instead of a complicated procedure for the texture exact compressed size calculation.

The following parameters are defined as follows:

I—a two-dimensional 16×16 array of the initial texture luma component values corresponding to a current macroblock with the elements I(x, y);

P—a two dimensional 16×16 array of the texture prediction luma component values corresponding to the current macroblock with the elements P(x, y);

A—one-dimensional array of 16 elements defined by equation:

$$A(x+4y) = \sum_{k=0}^{3}\sum_{j=0}^{3}(I(4x+j, 4y+k) - P(4x+j, 4y+k)),$$

where $x, y \in [0, 3]$;

C—one-dimensional array of 16 elements calculated as:

$$C(j) = \begin{cases} B(j) + B(j+4), & \text{if } j \in [0, 3] \\ B(j+4) + B(j+8), & \text{if } j \in [4, 7] \\ B(j-8) - B(j-4), & \text{if } j \in [8, 11] \\ B(j-4) - B(j), & \text{if } j \in [12, 15] \end{cases}$$

where the values B(j) are defined as:

$B(2k) = A(2k) + A(2k+1)$; and $B(2k+1) = A(2k) - A(2k+1)$ for $k \in [0;7]$.

The functions for the Discrete Cosine (DC) transform coefficients scaling (quantization and inverse quantization) used in H.264 texture processing are denoted as:

QUANT$_{4\times 4}$(X)—function for quantization of DC coefficient X of a 4×4 transform;

QUANT$_{8\times 8}$(X)—function for quantization of DC coefficient X of an 8×8 transform;

DEQUANT$_{4\times 4}$(X)—function for inverse quantization of DC coefficient X of a 4×4 transform; and DEQUANT$_{8\times 8}$(X)—function for inverse quantization of DC coefficient X of an 8×8 transform.

The inverse quantization functions are defined in the H.264 standard as (((M*X)<<S)+U)>>T, where M, S, U, T are pre-defined integer constants depending on the quantization parameter, and the symbols "<<" and ">>" show the arithmetic shifts of the integer value digits in binary representation (bit-wise shifts). The quantization functions are derived from the inverse quantization functions and have a similar form in H.264 conventional encoding algorithms.

The cost function for a 4×4 transform is calculated as:

$$COST_{4\times 4} = \sum_{j=0}^{15}\left\{\frac{[DEQUANT_{4\times 4}(QUANT_{4\times 4}(A(j)))/4 - A(j)]^2}{16}\right\} +$$

$$\lambda \cdot \sum_{j=0}^{15} R(QUANT_{4\times 4}(A(j)))$$

The cost function for a 8×8 transform is calculated as:

$$COST_{8\times 8} = \sum_{j=0}^{15}\left\{\frac{[DEQUANT_{8\times 8}(QUANT_{8\times 8}(C(j))) - C(j)]^2}{64}\right\} +$$

$$\lambda \cdot \sum_{j=0}^{15} R(QUANT_{8\times 8}(C(j)))$$

In the above equations, $\lambda$ is the standard Lagrangian multiplier used in H.264 Rate-Distortion optimization, which depends on the quantization parameter for the current macroblock.

The function R(x) is defined as:

$$R(x) = \begin{cases} 2*|x|, & \text{if } |x| < 14, \\ 28, & \text{if } |x| \geq 14 \end{cases}$$

Finally, the transform type that provides the minimum value of the corresponding COST function defined above may be considered as optimal in the rate-distortion sense for the current macroblock texture transform and encoding.

3. Acceleration of Optimal Macroblock Type Decision

For at least most application settings the most computationally complex part of H.264 video encoding is the procedure of choosing the optimal macroblock type (intra4×4, intra16×16, inter) and the parameters related to the type chosen. The calculation and the type selection is made in the decision-making module 14. Hereafter, it is assumed for simplicity that the optimal macroblock type is selected from intra 4×4, intra 16×16 and inter macroblock types.

In a variety of fast and efficient motion estimation methods the calculation of the optimal prediction modes for Intra 4×4 macroblock type becomes the most highly computational part of the decision-making method. Indeed, one of the nine Intra 4×4 prediction modes should be selected for each of sixteen 4×4 sub-blocks.

Described is a method for choosing the macroblock type that makes it possible to exclude consideration of the Intra 4×4 macroblock type from H.264 macroblock type decision-making procedure. Omitting calculation of the optimal Intra 4×4 prediction modes for the macroblocks often provides a significant speed-up of the encoding without reducing the compression efficiency of the encoder.

MB serves to denote a two-dimensional 16×16 array of picture luma component values corresponding to the current macroblock.

QP denotes the quantization parameter for the current macroblock.

For the purposes of the present explanation, it can be presumed that the best mode of Intra 16×16 prediction and the best motion vectors and reference frames for Inter prediction are already chosen, and that two-dimensional 16×16 arrays of texture predictions for luma component values corresponding to the current macroblock are calculated both for Inter and Intra 16×16 macroblock types.

Those prediction arrays are denoted here as $P_{INTER}$ and $P_{INTRA\_16\times16}$.

Two-dimensional arrays of differences between MB and $P_{INTER}$ are denoted as $R_{INTER}$ and two-dimensional array of differences between MB and $P_{INTRA\_16\times16}$ are denoted as $R_{INTRA\_16\times16}$.

One makes also usefully consider an auxiliary complexity function C(P).

P(x, y) denotes the elements of two-dimensional array P with the horizontal coordinate x and the vertical coordinate y. Consider the size of this array as N×N, where N is an even number and the values of x and y are in a range [0,N−1].

The function C(P) is defined as:

$$C(P) = \sum_{k=0}^{\frac{N}{2}-1} \sum_{j=0}^{\frac{N}{2}-1} \left| P(2j+1, 2k+1) - \frac{P(2j, 2k+1) + P(2j, 2k) + P(2j+1, 2k) + P(\min(N-1, 2j+2), 2k)}{4} \right|$$

where min(a, b) is the minimum value of a and b.

The sum of the absolute values of all the array P elements is denoted below as SAD(P).

The testing of Intra 4×4 macroblock type in the decision procedure may be omitted if at least one of the following conditions is satisfied:

SAD($R_{INTER}$)<M(QP)·log$_2$(C(MB)); and

SAD($R_{INTRA\_16\times16}$)>max(K·SAD($R_{INTER}$)+S(QP),T(QP)).

The expressions above contain the parameter K and parameters M(QP), S(QP), T(QP), which depend on the value of QP.

The values of the parameters M(QP), S(QP), T(QP) may be chosen according to the requirements of keeping the compression efficiency and speeding-up the decision making procedure.

In particular, the sufficient reliability of the method and decision-making speed-up are provided by K=5.86, and values M(QP), S(QP), and T(QP) taken from the following arrays, where QP is the index in the array.

Examples of values of M(QP), T(QP) and S(QP) parameters

M(QP)=
{12.11, 12.11, 12.11, 12.11, 12.11, 12.11, 12.11, 12.11, 12.11, 12.11, 12.11, 13.13, 13.48, 13.87, 14.96, 15.66, 16.80, 17.30, 18.36, 19.73, 21.99, 23.67, 26.09, 28.52, 31.84, 34.77, 37.99, 41.02, 44.14, 46.37, 49.10, 52.73, 54.96, 59.61, 63.48, 68.36, 73.24, 78.13, 83.59, 89.06, 94.53, 100.00, 105.47, 114.26, 123.05, 131.84, 140.63, 153.13, 165.63, 178.13, 190.63, 203.13},

S(QP)=
{900, 900, 900, 900, 900, 900, 900, 900, 900, 900, 900, 900, 900, 900, 900, 900, 900, 900, 900, 900, 900, 900, 920, 950, 1000, 1080, 1190, 1350, 1536, 1690, 1870, 2080, 2340, 2600, 2840, 3060, 3280, 3500, 3840, 4230, 4580, 5020, 5500, 6170, 6920, 7620, 8500, 9390, 10310, 11280, 12110, 13000},

T (QP)=
{256, 256, 256, 256, 256, 256, 256, 256, 256, 256, 256, 256, 256, 256, 256, 256, 256, 256, 265, 273, 281, 289, 300, 313, 320, 329, 353, 369, 400, 425, 433, 457, 465, 500, 521, 545, 553, 568, 594, 610, 634, 658, 700, 778, 882, 1000, 1176, 1404, 1653, 1901, 2142, 2400}.

4. Modulation of Quantization Parameter (QP) with Look-Ahead Refinement

QP—modulation is a method for dynamic quality distribution inside the encoded picture. For a proper planning of the current frame encoding, the present teaching will accommodate a "look-ahead" refinement. The proposed algorithm is based on the approximated importance calculated for each macroblock in the current picture by QP modulator 20 using information about the next frame complexity and motion received from the picture preliminary analyzer 22. Using the look-ahead approach, an importance map is modified to improve quality of at least important parts of the picture. Experimental results show that the proposed QP-modulation algorithm with look-ahead facilities often results in a significant enhancement of picture quality.

By one approach such a QP-modulation algorithm includes the following steps:

preparing a reduced resolution picture (RRP) for each frame in the sequence;

performing macroblock-based motion estimation for each RRP, except the first RRP;

calculating the Inter-complexity and Intra-complexity functions for each macroblock in these RRPs;

calculating the importance as the minimal value of the Inter-complexity function and the Intra-complexity function;

creating an importance map;

filtering the importance map using a multi-pass non-linear filter;

if the importance map of previous RRP is not yet refined, running a look-ahead refinement for the previous picture and forward the previous RRP to the encoder; and modulating the quantization parameter using the prepared importance map.

Preparation of a Reduced Resolution Picture (RRP) can be performed using simple averaging. By one approach, in each direction resolution is reduced twice. Accordingly, each pixel in an RRP can be calculated as:

RRP[x]/[y]=(Luma_Orig[x*2]/[y*2]+Luma_Orig[x*2+1]/[y*2]+Luma_Orig[x*2]/[y*2+1]++Luma_Orig[x*2+1]/[y*2+1]+2)/4

Macroblock Motion Estimation can be performed using the complexity based motion search algorithm as described above in the present application.

As regards Inter and Intra complexity calculation, each complexity represents an estimated number of bits required to encode a given macroblock. For many application settings complexities should be normalized to range [0:255] to avoid overflow during future calculations.

Non-linear filtering for importance map can be performed in both directions X and Y separately. By one approach, for each instance of importance in the importance map the following is found:

In Horizontal direction filtering:
A=Importance[x−1][y];
B=Importance[x][y];
C=Importance[x+1][y];
D=median(A,B,C); and
Importance[x][y]=(A+D*2+C)/4.

In Vertical direction filtering:
A=Importance[x][y−1];
B=Importance[x][y];
C=Importance[x][y+1];
D=median(A,B,C); and
Importance[x][y]=(A+D*2+C)/4.

This operation is performed several times, as required by the user-defined parameter.

Look-Ahead Refinement refers to the refinement of the importance map of RRP[−1] (referring to the previous picture) using motion information from RRP[0] (referring to the current picture). Each found vector of the current macroblock points to the region of a previous picture, and this region should be coded better than others. To achieve this result, the importance of the macroblock which contains this region can be calculated using a simple formula:

NewImportance[x+mvx][y+mvy]=(NewImportance
 [x+mvx][y+mvy]+CurrentImportance[x][y])/4, where:
mvx and mvy—the motion vectors found during motion estimation for the current picture.

QP-modulation with a prepared importance map is performed as follows. For each macroblock the Quantization Parameter (mbQP) can be calculated as:

deltaQP=(importance−avg_importance)/8;

min_deltaQP=−avg_importance/8;

max_deltaQP=+avg_importance/8;

deltaQP=max(min_deltaQP,deltaQP);

deltaQP=min(max_deltaQP,deltaQP); and mbQP=frameQP+deltaQP;

where avg_importance is the average importance of all macroblocks in the picture.

5. Pipelined Video Processing

In video encoding systems many transforms can be performed with input video before encoding: video formats conversion, image resizing, de-interlacing, various digital filters for the image quality improvements, etc. Usually a sequence of transforms should be applied before actual encoding. FIG. 1 shows the pre-processing module 24 performing such functions. Similar transforms should be done on the decoder side.

Consider an image transform from the initial input image I to the resulting output image O. Typically, for calculating one pixel of the output image this process can perform some arithmetic operation over the values of several neighboring pixels of the input image. For example, to smooth the texture of the image I we may calculate each pixel of O by averaging the corresponding pixel of I with its neighboring pixels:

$$O[x][y] = \left( \sum_{j=-1}^{1} \sum_{k=-1}^{1} I[x+j][y+k] \right) / 9;$$

The above example also shows that in general it can be useful to retain in memory several lines of the input image while calculating one line of the output image.

While performing the image transform from the input image to the output image, the general data exchange can be carried out as follows. Both input and output images are stored at the external memory. To perform the arithmetic operations over the input pixels values this process first transfers them to the processor memory, which capacity in this example allows storing just several lines of the image pixels and does not allow storing the entire input or output images. After calculating the resulting value of the output image pixel, this value is sent back to the external memory, where the output image is stored. Then this operation is repeated to calculate the next output pixel and so on. Thus, the image transform requires passing all the image pixels though the processor memory.

In video processing there is often a need to perform complex image transforms. This can comprise applying of several simple (elementary) transforms. After fulfilling one elementary transform, the intermediate resulting image can be stored in an external memory and used at the next step as an input for the next elementary transform. In general, each of these elementary transforms requires sending all the image pixels from and to the external memory. However, the data exchange between the external memory and the processor memory is a time-consuming operation. The more data that is required to be sent from the external memory to the internal processor memory and back, the lower is the speed of the processing. That is why, at least in part, the complex transforms of an image may cause massive data exchange between the processor memory and the external memory, which may lead to a significant slowdown.

Thus, in real-time video processing a special attention should usually be paid to optimization of the data exchange in complex image transform designs. Of course, if all the elementary transforms composing the chain of the complex transform are known in advance before the implementation, the computations can be easily merged into one transform to avoid the multiple data exchange mentioned above. But in a more typical situation there is a large number of possible elementary transforms, and the chains of these transforms are being formed on-the-fly during the video processing session.

The proposed pipelined video processing method is directed to optimize the data exchange between an external memory and the processor memory for complex image transforms.

A pipelined video processing is a method for implementing the chains of video elementary transforms in the case when the chain of transforms is formed on-the-fly during the video processing session. The method is directed to reducing the data exchange between the processor memory and the external memory, where the input and output frames are stored.

Figure 2:
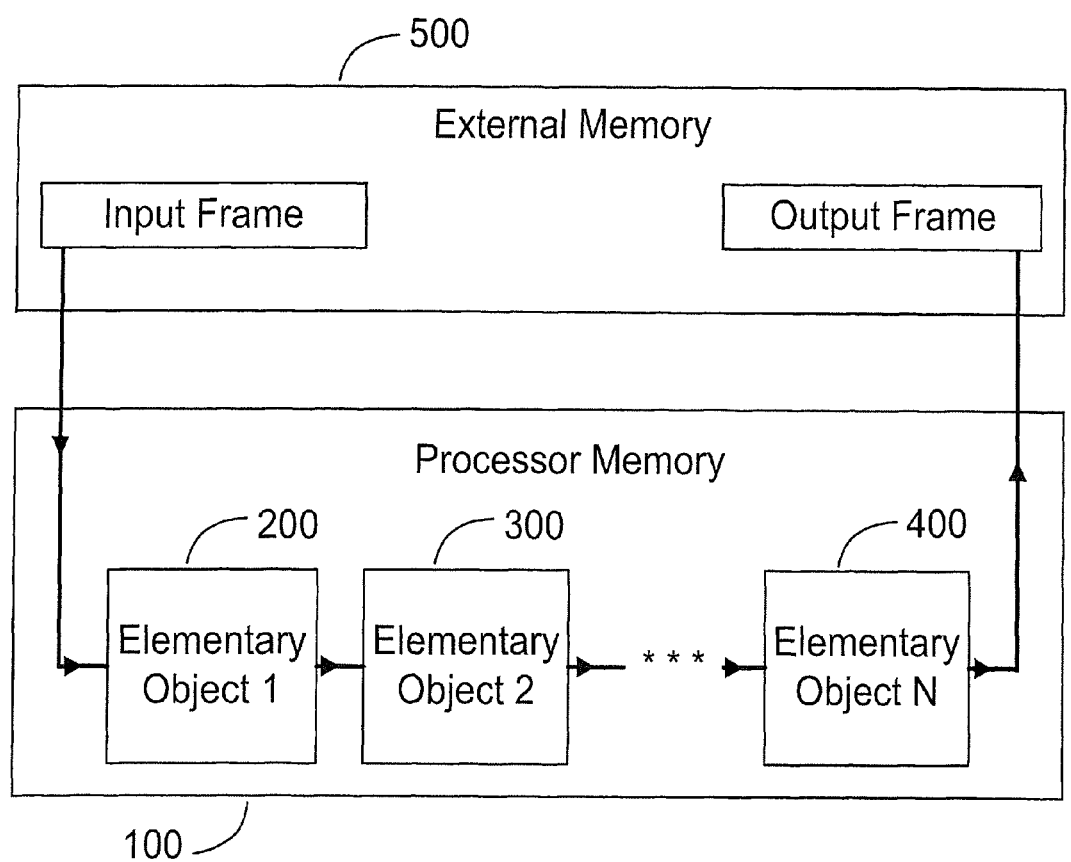
FIG. 2 shows a pipeline video processing unit for complex transform.
Figure 3:
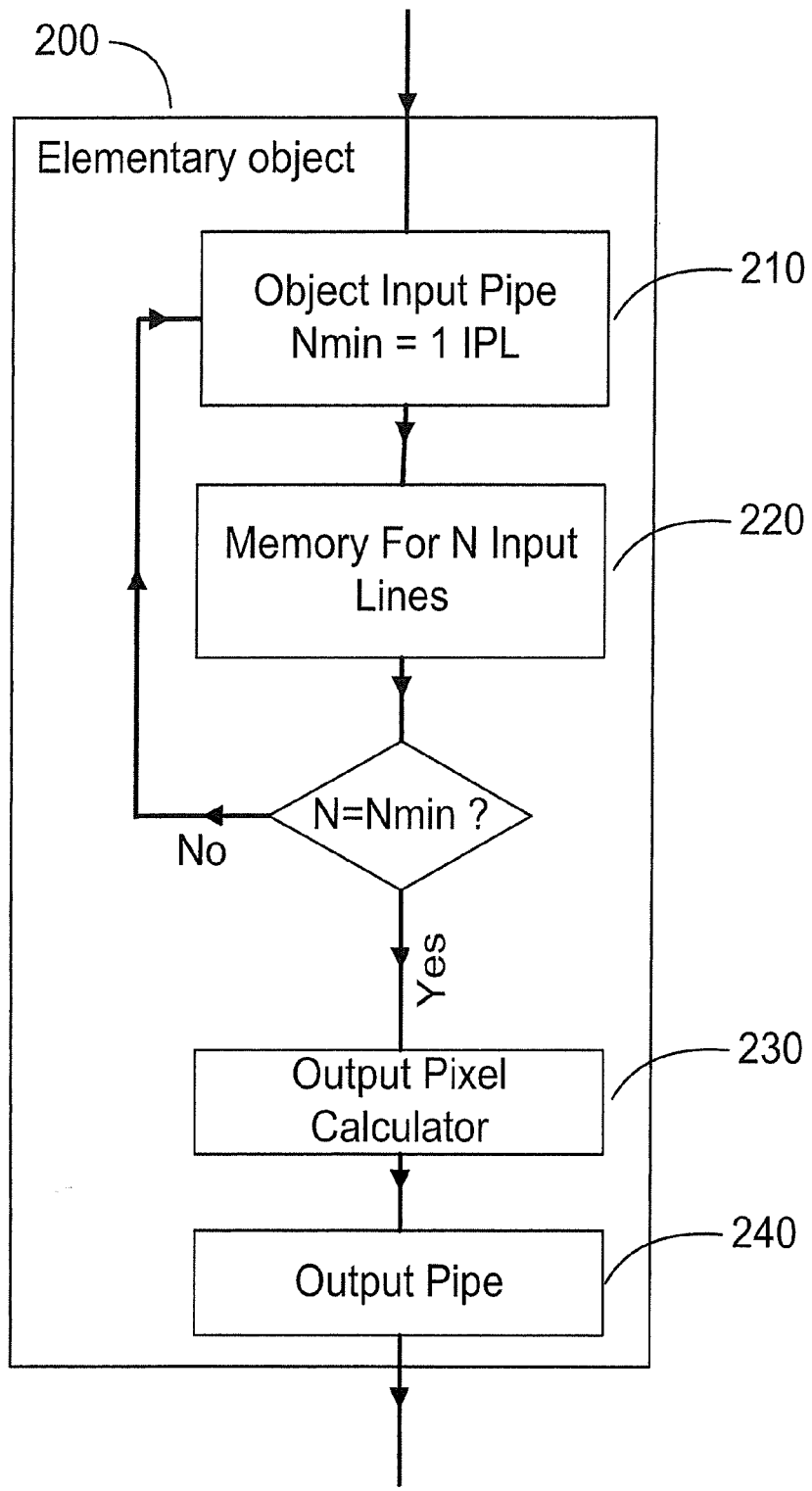
FIG. 3 shows a block-diagram of an elementary object used in pipeline video processing.

An exemplary and illustrative approach to such pipelined video processing method comprises the implementation architecture and corresponding usage flow, as shown in FIGS. 2 and 3.

As shown in FIG. 2, the pipelined video processing unit 100 comprises a set of N functional units referred to here as elementary objects (200, 300, 400) that reside in processor memory. Each of these objects is responsible for its own type of elementary transform and contains the information about the minimal number of input image pixels lines required for calculating one line of the output pixels. FIG. 3 shows a block diagram of an elementary object. Each elementary object comprises:

a input pipe 210;
a memory 220 for storing the requested amount of input image lines;
a calculating unit 230 configured to calculate the output pixels; and
an output pipe 240.

The input pipe 210 of the elementary object 200 receives sequentially the lines of the input image from an external memory 500 (as shown in FIG. 3). In this illustrative example the minimal data amount sent via a pipe is one line of pixels. These input lines are stored in the internal memory 220 of the object. The minimum number of lines required to produce an output line is $N_{min}$. When the number of the lines $N=N_{min}$, the output pixels calculating unit 230 calculates one line of output pixels according to its algorithm and sends the line of pixels to the output pipe 240. (When the number of lines N<$N_{min}$ the object 200 continues to await a sufficient number of lines).

When the object 200 receives the next input line, the previous line of the input pixels is removed from the internal memory using a first-in/first out (FIFO) rule, and the newly received line is stored in the internal memory 220. When the predefined number of the input lines $N_{min}$ is received, the calculating unit 230 calculates the next output line. The process is repeated until processing for the entire frame is completed.

In order to implement a complex transform of an image, by one approach the elementary objects responsible for each elementary transform are connected into one chain in the corresponding order, and the initial image lines sent to the input pipe of the first elementary object in the chain. The output pipe of the first object is connected to the input pipe of the second object so that the second elementary object can receive the output lines of the first object and produce its own output, and so on, as shown in FIG. 2. The output of the chain will produce the requested output image of the complex transform.

Since each elementary object stores just several input pixel lines, the number of pixel lines stored in all objects of the chain is restricted, and thus the entire chain may be kept in the processor memory with no need to conduct a data of exchange with the external memory 500. Therefore, the input image pixels may be sent from the external memory to the processor only once during the processing of a frame, and the resulting output pixels sent to the external memory only once. Accordingly, the use of the proposed method minimizes the intensity of data exchange between the external memory and the processor and leads to significant acceleration of high resolution video processing.

6. Algorithm for Film-Grain Parameters Calculation

The following algorithm will serve to calculate the film-grain parameters for the video encoding. It is performed in module 26 of the system as shown in FIG. 1 and comprises the following steps:

calculating a difference between the original frame and the coded frames to thereby create a difference frame;
dividing the difference frame into macroblocks (16×16 for luma plane and 8×8 for chroma plane);
calculating the variance and the average of intensity for each macroblock;
if the variance is less than some predefined threshold DCT2, performing the transformation for the difference frame to receive the spectrum of this block;
finding an average spectrum for all blocks with the average intensity lying in a given intensity interval selected from a number of intensity intervals;
calculating the noise level as a mean of all amplitude values for frequencies lower than a predetermined level (the vertical and horizontal cut frequency can be found automatically or set manually (for example, value 10 for a 16×16 block shows good results)); and
quantizing the noise level according to its intensity interval.

Those skilled in the art will appreciate that the above-described processes are readily enabled using any of a wide variety of available and/or readily configured platforms, including partially or wholly programmable platforms as are known in the art or dedicated purpose platforms as may be desired for some applications. The preceding description is intended to be illustrative of the principles of the invention, and it will be appreciated that numerous changes and modifications may occur to those skilled in the art, and it is intended in the appended claims to cover all those changes and modifications which fall within the true spirit and scope of the present invention.

The invention claimed is:

1. A video codec with high compression efficiency, the video codec comprising:
a macroblock encoding module configured to receive a digitized picture divided into macroblocks, encode at least some of the macroblocks of the picture and output a compressed stream of pixels; and
a quantization parameter modulator operably coupled to the macroblock encoding module and configured to calculate quantization parameters for the macroblocks;
wherein the macroblock encoding module comprises:
a motion estimation unit configured to estimate macroblock motion based at least in part on a measurement function for motion search of a matching texture block; and
a macroblock decision-making unit that is responsible to the motion estimation unit and that is configured to optimize selection of macroblock type and transform size;
the measurement function for motion search is calculated as:

$$W(I,R,M,N,QP,mvx,mvy)=C(I)\cdot(SAD(I,R)+Cost(M,N,mvx,mvy,QP))+M\cdot N\cdot C(R),$$

where:
M, N—width and height of a current texture block;
I—two-dimensional M×N array of initial texture luminance component values corresponding to the current texture block with elements I(x, y),
where x∈[0,M−1], y∈[0,N−1];
R—two-dimensional M×N array of texture prediction luminance component values corresponding to a reference texture block with elements R(x, y),
where x∈[0,M−1], y∈[0,N−1];
QP—a quantization parameter used for video encoding;
mvx,mvy—components of difference between a current motion offset and a current motion vector prediction;
SAD(I, R)—is a Sum of Absolute Differences between corresponding elements of the arrays I and R;
Cost(M,N,mvx,mvy,QP)—a motion vector cost function; and
C(A)—a complexity function for two-dimensional array A, A corresponding to arrays I or R, respectively:

$$C(A) = \sum_{y=0}^{N-1}\sum_{x=0}^{M-1} F(A, x, y, B_H(x), B_V(y));$$

where
F(A, x, y, dx, dy) is auxiliary function for a two-dimensional M×N array A; and
$B_H(x), B_V(y)$—boundary indicator functions for first and second indices of the two-dimensional M×N array, which are equal to:
+1, if index equals a minimal value (zero);
−1, if the index equals a maximal value ((M−1) for $B_H(x)$ and (N−1) for $B_V(y)$);
and 0—otherwise.

2. The video codec according to claim 1, further comprising a pre-processing module configured to perform input video preliminary processing, including:
dividing the digitized picture into groups of pixels to thereby provide the macroblocks;

performing format transforms;
performing filtering; and
providing quality improvement.

3. The video codec according to claim 2, wherein the pre-processing module is configured to provide pipelined video processing.

4. The video codec according to claim 1, further comprising a film grain calculation module configured to restore an original film-grain effect.

5. A method of video encoding using a codec with high compression efficiency, the method comprising:
dividing an input picture into macroblocks of pixels;
calculating quantization parameters for at least some of the macroblocks;
performing motion estimation based on a measurement function for motion search of a matching texture block;
calculating an optimal macroblock type; and
selecting an optimal transform size for corresponding macroblock transforms;
wherein the measurement function for motion estimation is calculated as:

$$W(I,R,M,N,QP,mvx,mvy)=C(I)\cdot(SAD(I,R)+Cost(M,N,mvx,mvy,QP))+M\cdot N\cdot C(R),$$

where:
M, N—width and height of a current texture block;
I—two-dimensional M×N array of initial texture luminance component values corresponding to the current texture block with elements I(x, y), where $x\in[0,M-1]$, $y\in[0,N-1]$;
R—two-dimensional M×N array of texture prediction luminance component values corresponding to a reference texture block with elements R(x, y), where $x\in[0,M-1]$, $y\in[0,N-1]$;
QP—a quantization parameter used for video encoding;
mvx,mvy—components of difference between a current motion offset and a current motion vector prediction;
SAD(I,R)—is a Sum of Absolute Differences between corresponding elements of the arrays I and R;
Cost(M,N,mvx,mvy,QP)—a motion vector cost function; and
C(A)—a complexity function for two-dimensional array A, A corresponding to arrays I or R, respectively:

$$C(A) = \sum_{y=0}^{N-1}\sum_{x=0}^{M-1} F(A, x, y, B_H(x), B_V(y));$$

where
F(A, x, y, dx, dy) is auxiliary function for a two-dimensional M×N array A; and
$B_H(x), B_V(y)$—boundary indicator functions for first and second indices of the two-dimensional M×N array, which are equal to:
+1, if index equals a minimal value (zero);
−1, if the index equals a maximal value ((M−1) for $B_H(x)$ and (N−1) for $B_V(y)$);
and 0—otherwise.

6. The method of video encoding according to claim 5, comprising preliminary processing input video using pipelined video processing.

7. The method of pipelined video processing in a video encoding system of claim 6, comprising:
providing at least one elementary object, the object having one input data pipe and one output data pipe;
sending at least one line of pixels of an input image from an external memory to the input data pipe;
storing input pixel lines in an internal object memory;
when the number of input lines in the internal object memory equals a predefined number, calculating a line of output pixels;
forwarding at least one line of output pixels to the output data pipe;
repeating until processing of the input image is complete; and
combining lines of output pixels into an output image.

8. The method of claim 7, wherein, in case of complex transform, the method comprises:
providing a plurality of elementary objects corresponding to elementary transforms;
combining the plurality of elementary objects into a chain having one input data pipe and one output data pipe, each object being responsible for a respective transform;
sending the input image pixels into input data pipe of the chain; and
receiving the lines of output pixels from the chain output data pipe.

9. The method of video encoding according to claim 5, wherein the calculation of quantization parameters for at least some of the macroblocks is performed using a look-ahead approach.

10. The method of calculating quantization parameters in a video sequence encoder of claim 9, comprising:
creating a reduced resolution picture for each frame in the video sequence;
performing block-based motion estimation for each reduced resolution picture beginning with a second frame of the video sequence;
calculating Inter-complexity and Intra-complexity functions for each macroblock in the reduced resolution picture;
calculating importance as a minimal value of the Inter-complexity function and the Intra-complexity function;
creating an importance map;
filtering the importance map using a multi-pass non-linear filter; and
modulating a quantization parameter using the importance map.

11. The method of modulating the quantization parameter of claim 10, comprising reducing direct resolution twice in each direction and calculating each pixel in the reduced resolution picture as:

$$RRP[x]/[y]=(Luma\_Orig[x*2]/[y*2]+Luma\_Orig[x*2+1]/[y*2]+Luma\_Orig[x*2]/[y*2+1]++Luma\_Orig[x*2+1]/[y*2+1]+2)/4.$$

12. The method of claim 10, comprising refining an importance map of a previous reduced resolution picture using motion information from a current reduced resolution picture.

13. The method of claim 12, wherein an importance is calculated as:

$$NewImportance[x+mvx]/[y+mvy]=(NewImportance[x+mvx]/[y+mvy]+CurrentImportance[x]/[y])/4,$$

where:
mvx and mvy—motion vectors found during block-based motion estimation for the current picture.

14. The method of claim 5, wherein the auxiliary function F(A, x, y, dx, dy) is calculated as:

$$F = \frac{1}{8} \cdot \left| 9 \cdot A(x, y) - \sum_{k=-1}^{1} \sum_{j=-1}^{1} A(x+j, y+k) \right|,$$

if $dx = 0, dy = 0$;

$$F = \frac{1}{4} |4 \cdot A(x, y) - A(x+dx, y) - A(x, y+dy) - 2 \cdot A(x+dx, y+dy)|$$

if $dx \neq 0, dy \neq 0$;

$$F = \frac{1}{8} \cdot \left| \begin{array}{c} 8 \cdot A(x, y) - A(x, y-1) - A(x, y+1) - \\ 2 \cdot (A(x+dx, y-1) + A(x+dx, y) + A(x+dx, y+1)) \end{array} \right|$$

if $dx \neq 0$ and $dy = 0$; and $$F = \frac{1}{8} \cdot \left| \begin{array}{c} 8 \cdot A(x, y) - A(x-1, y) - A(x+1, y) - \\ 2 \cdot (A(x-1, y+dy) + A(x, y+dy) + A(x+1, y+dy)) \end{array} \right|$$

if $dx = 0$ and $dy \neq 0$.

15. The method of claim 5, wherein the step of selecting the optimal transform size for a current macroblock transform comprises:

defining a function for quantization of Discrete Cosine (DC) transform coefficients for a 4×4 transform;

defining a function for quantization of Discrete Cosine (DC) transform coefficients for an 8×8 transform;

defining a function for inverse quantization of Discrete Cosine (DC) transform coefficients for a 4×4 transform;

defining a function for inverse quantization of Discrete Cosine (DC) transform coefficients for an 8×8 transform;

calculating a cost function for a 4×4 transform based on the functions for quantization and inverse quantization of DC transform coefficients for a 4×4 transform and a quantization parameter for the current macroblock;

calculating a cost function for an 8×8 transform based on the functions for quantization and inverse quantization of DC transform coefficients for an 8×8 transform and the quantization parameter for the current macroblock;

comparing values of cost functions for a 4×4 transform and for an 8×8 transform; and selecting an optimal transform size based on the cost function with a minimum value.

16. The method of claim 15, wherein the cost function for the 4×4 transform is calculated as:

$$COST_{4\times 4} = \sum_{j=0}^{15} \left\{ \frac{[DEQUANT_{4\times 4}(QUANT_{4\times 4}(A(j)))/4 - A(j)]^2}{16} \right\} +$$

$$\lambda \cdot \sum_{j=0}^{15} R(QUANT_{4\times 4}(A(j)))$$

and the cost function for the 8×8 transform is calculated as:

$$COST_{8\times 8} = \sum_{j=0}^{15} \left\{ \frac{[DEQUANT_{8\times 8}(QUANT_{8\times 8}(C(j))) - C(j)]^2}{64} \right\} +$$

$$\lambda \cdot \sum_{j=0}^{15} R(QUANT_{8\times 8}(C(j)))$$

where:
$QUANT_{4\times 4}$ (X) is a function for quantization of DC coefficient X of 4×4 transform;
$QUANT_{8\times 8}$ (X) is a function for quantization of DC coefficient X of 8×8 transform;
$DEQUANT_{4\times 4}$ (X) is a function for inverse quantization of DC coefficient X of 4×4 transform;
$DEQUANT_{8\times 8}$ (X) is a function for inverse quantization of DC coefficient X of 8×8 transform;

$$R(x) = \begin{cases} 2 * |x|, & \text{if } |x| < 14, \\ 28, & \text{if } |x| \geq 14; \end{cases}$$

$\lambda$ is a Lagrangian multiplier;
A is a one-dimensional array of 16 elements:

$$A(x+4y) = \sum_{k=0}^{3} \sum_{j=0}^{3} (I(4x+j, 4y+k) - P(4x+j, 4y+k));$$

for $x, y \in [0, 3]$;

I(x, y) is a two-dimensional 16×16 array of initial texture luma component values corresponding to a current block with elements x and y;
P(x, y) is a two dimensional 16×16 array of texture prediction luma component values corresponding to the current block with elements x and y; and
C is a one-dimensional array of 16 elements calculated as:

$$C(j) = \begin{cases} B(j) + B(j+4), & \text{if } j \in [0, 3] \\ B(j+4) + B(j+8), & \text{if } j \in [4, 7] \\ B(j-8) - B(j-4), & \text{if } j \in [8, 11] \\ B(j-4) - B(j), & \text{if } j \in [12, 15] \end{cases}$$

wherein values B(j) are defined as:

$B(2k) = A(2k) + A(2k+1)$, $B(2k+1) = A(2k) - A(2k+1)$, for $k \in [0;7]$.

17. A method of accelerating selection of optimal macroblock type in a video sequence encoder with high compression efficiency, comprising:

defining a two-dimensional 16×16 array of picture luma component values corresponding to a current macroblock MB;

choosing a best mode of Intra 16×16 prediction;

choosing best motion vectors and reference frames of Inter prediction;

calculating two-dimensional 16×16 arrays of texture prediction for luma component values corresponding to current macroblock for Intra 16×16 macroblock type $P_{INTRA\_16\times 16}$ and for Inter macroblock type $P_{INTER}$;

calculating two dimensional arrays of differences $R_{INTRA\_16\times 16}$ between MB and $P_{INTRA\_16\times 16}$;

calculating two dimensional arrays of differences $R_{INTER}$ between MB and $P_{INTER}$;

calculating a sum of absolute values $SAD(R_{INTER})$;

calculating a sum of absolute values SAD($R_{INTRA\_16\times16}$);
calculating an auxiliary complexity function C(MB) as:

$$C(MB) = \sum_{k=0}^{\frac{N}{2}-1} \sum_{j=0}^{\frac{N}{2}-1} \left| MB(2j+1, 2k+1) - \frac{MB(2j, 2k+1) + MB(2j, 2k) + MB(2j+1, 2k) + MB(\min(N-1, 2j+2), 2k)}{4} \right|$$

where
MB(x,y)—elements of 16×16 two-dimensional macroblock texture array with horizontal coordinate x and vertical coordinate y;
N=16; and
min (a,b) is the minimum value of a and b;
wherein no testing of Intra 4×4 macroblock type is required, when the following conditions are satisfied:

SAD($R_{INTER}$)<M(QP)·log$_2$(C(MB)); and

SAD($R_{INTRA\_16\times16}$)>max(K·SAD($R_{INTER}$)+S(QP),T(QP)), where:
QP is a quantization parameter for the current macroblock; and
K, M(QP), S(QP), T(QP) are parameters selected based on the encoder compression efficiency and acceleration of decision-making procedure.

18. The method of claim 17, wherein K=5.86, and values of M(QP), S(QP), and T(QP) are each selected from a corresponding array as follows:

M (QP)=
{12.11, 12.11, 12.11, 12.11, 12.11, 12.11, 12.11, 12.11, 12.11, 12.11, 12.11, 13.13, 13.48, 13.87, 14.96, 15.66, 16.80, 17.30, 18.36, 19.73, 21.99, 23.67, 26.09, 28.52, 31.84, 34.77, 37.99, 41.02, 44.14, 46.37, 49.10, 52.73, 54.96, 59.61, 63.48, 68.36, 73.24, 78.13, 83.59, 89.06, 94.53, 100.00, 105.47, 114.26, 123.05, 131.84, 140.63, 153.13, 165.63, 178.13, 190.63, 203.13},

S(QP)=
{900, 900, 900, 900, 900, 900, 900, 900, 900, 900, 900, 900, 900, 900, 900, 900, 900, 900, 900, 900, 900, 900, 920, 950, 1000, 1080, 1190, 1350, 1536, 1690, 1870, 2080, 2340, 2600, 2840, 3060, 3280, 3500, 3840, 4230, 4580, 5020, 5500, 6170, 6920, 7620, 8500, 9390, 10310, 11280, 12110, 13000},

T (QP)=
{256, 256, 256, 256, 256, 256, 256, 256, 256, 256, 256, 256, 256, 256, 256, 256, 256, 256, 265, 273, 281, 289, 300, 313, 320, 329, 353, 369, 400, 425, 433, 457, 465, 500, 521, 545, 553, 568, 594, 610, 634, 658, 700, 778, 882, 1000, 1176, 1404, 1653, 1901, 2142, 2400}.

* * * * *